United States Patent
Hong et al.

(10) Patent No.: US 10,649,230 B2
(45) Date of Patent: May 12, 2020

(54) PARALLAX BARRIER PANEL, DISPLAY SUBSTRATE, DISPLAY DEVICE, ELECTRONIC EQUIPMENT AND DISPLAY METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yezhou Hong, Beijing (CN); Xiong Hu, Beijing (CN); Bin Zhao, Beijing (CN); Lili Chen, Beijing (CN); Wei Sun, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 259 days.

(21) Appl. No.: 15/553,533

(22) PCT Filed: Jan. 4, 2017

(86) PCT No.: PCT/CN2017/000044
§ 371 (c)(1),
(2) Date: Aug. 24, 2017

(87) PCT Pub. No.: WO2017/215251
PCT Pub. Date: Dec. 21, 2017

(65) Prior Publication Data
US 2019/0101768 A1    Apr. 4, 2019

(30) Foreign Application Priority Data
Jun. 14, 2016 (CN) .......................... 2016 1 0412846

(51) Int. Cl.
*G02B 30/27* (2020.01)
*H04N 13/378* (2018.01)
(Continued)

(52) U.S. Cl.
CPC ............. *G02B 30/27* (2020.01); *G02B 30/00* (2020.01); *G02F 1/1335* (2013.01);
(Continued)

(58) Field of Classification Search
CPC .. G02B 27/2214; G02B 27/22; H04N 13/236; H04N 13/371; H04N 13/378;
(Continued)

(56) References Cited

U.S. PATENT DOCUMENTS

2011/0051239 A1    3/2011  Daiku
2013/0208099 A1    8/2013  Ohmi
(Continued)

FOREIGN PATENT DOCUMENTS

CN    102006491 A    4/2011
CN    102096231 A    6/2011
(Continued)

OTHER PUBLICATIONS

"First office action," CN Application No. 201610412846.5 (dated Oct. 17, 2017).
(Continued)

*Primary Examiner* — Wen Huang
(74) *Attorney, Agent, or Firm* — Womble Bond Dickinson (US) LLP (57) ABSTRACT

The embodiments of the present invention provide a parallax barrier panel, a display substrate, a display device, an electronic equipment and a display method. The parallax barrier panel includes a switchable array and a control module. The switchable array is used for forming a parallax barrier. The control module is used for adjusting the direc-
(Continued)

tion of the parallax barrier based on the interocular direction of an observer. By adjusting the direction of the parallax barrier based on the interocular direction of the observer, an ideal three-dimensional display effect can always be provided to the observer during three-dimensional display.

12 Claims, 6 Drawing Sheets

(51) Int. Cl.
| | | |
|---|---|---|
| *H04N 13/236* | (2018.01) | |
| *G02F 1/1335* | (2006.01) | |
| *H04N 13/371* | (2018.01) | |
| *G02B 30/00* | (2020.01) | |
| *H04N 13/31* | (2018.01) | |
| *G02F 1/1347* | (2006.01) | |
| *G06F 3/01* | (2006.01) | |

(52) U.S. Cl.
CPC ..... *G02F 1/133526* (2013.01); *H04N 13/236* (2018.05); *H04N 13/31* (2018.05); *H04N 13/371* (2018.05); *H04N 13/378* (2018.05); *G02F 1/13471* (2013.01); *G06F 3/013* (2013.01)

(58) Field of Classification Search
CPC . H04N 13/31; G02F 1/1335; G02F 1/133526; G06F 3/013
See application file for complete search history.

(56) References Cited

U.S. PATENT DOCUMENTS

| | | | | |
|---|---|---|---|---|
| 2014/0078045 | A1* | 3/2014 | Yang | H04N 13/31 345/156 |
| 2015/0029584 | A1* | 1/2015 | Song | G02F 1/29 359/463 |
| 2016/0059122 | A1* | 3/2016 | Ehara | A63F 13/2145 463/31 |
| 2016/0059128 | A1* | 3/2016 | Ito | A63F 13/52 463/32 |

FOREIGN PATENT DOCUMENTS

| | | |
|---|---|---|
| CN | 103207456 A | 7/2013 |
| CN | 104994373 A | 10/2015 |
| CN | 204810455 U | 11/2015 |
| CN | 105892076 A | 8/2016 |

OTHER PUBLICATIONS

Office Action received for Chinese Patent Application No. 201610412846.5, dated May 17, 2018, 13 pages (6 pages of English Translation and 7 pages of Office Action).
International Search Report and Written Opinion in PCT/CN2017/000044 dated Apr. 6, 2017, with English translation.

* cited by examiner

PARALLAX BARRIER PANEL, DISPLAY SUBSTRATE, DISPLAY DEVICE, ELECTRONIC EQUIPMENT AND DISPLAY METHOD

RELATED APPLICATIONS

The present application is the U.S. national phase entry of the international application PCT/CN2017/000044, with an international filing date of Jan. 3, 2017, which claims the benefit of Chinese Patent Application No. 201610412846.5, filed on Jun. 14, 2016, the entire disclosures of which are incorporated herein by reference.

TECHNICAL FIELD

The present invention relates to the field of display technology, and more particularly to a parallax barrier panel, a display substrate, a display device, an electronic equipment and a display method.

BACKGROUND

When a conventional parallax barrier is applied for realizing three-dimensional display, the parallax barrier is used to control the transmission state of light in the direction of horizontal axis or vertical axis. By applying the parallax barrier, the left eye and right eye of the observer respectively obtain different images corresponding to the left eye and the right eye, resulting in three-dimensional vision.

SUMMARY

Normally, if the screen of the electronic equipment (especially the screen of the mobile electronic equipment) is rotated, the displayed image should be adjusted accordingly. In this case, this conventional parallax barrier will be ineffective. Therefore, it is desirable to provide a parallax barrier panel, a display device applying the parallax barrier panel and a display method, so as to adaptively provide the observer with a desired three-dimensional display effect.

To this end, the embodiments of the present invention provide a parallax barrier panel, a display substrate, a display device, an electronic equipment and a display method.

According to an aspect of the invention, an embodiment of the invention provides a parallax barrier panel. The parallax barrier panel includes: a switchable array for forming a parallax barrier, and a control module for adjusting a direction of the parallax barrier based on an interocular direction of an observer.

During observing the three-dimensional image, the observer may probably unconsciously adjust his posture with respect to the display equipment. For example, for hand held three-dimensional image display equipment, it is difficult for a user to hold or maintain the display equipment with a precise angle. A small posture adjustment will also make it difficult for the parallax barrier to meet the condition for three-dimensional display, thus undermining the three-dimensional display effect. By adjusting the direction of the parallax barrier based on the interocular direction of the observer, an ideal three-dimensional display effect can always be provided to the observer during three-dimensional display.

Optionally, the direction of the parallax barrier is perpendicular to the interocular direction of the observer.

The direction of the parallax barrier is kept perpendicular to the interocular direction of the observer, simplifying the matching relationship between the parallax barrier and the displayed image. It can be understood by those skilled in the art that when a three-dimensional image is normally presented, the direction of the conventional parallax barrier may be inclined with respect to the interocular direction of the observer and matched with the displayed image. Therefore, in the embodiment of the present invention, the control module adjusts the direction of the parallax barrier based on the interocular direction of the observer so that the observer can always observe the three-dimensional image in the normal way.

Optionally, the control module further adjusts the width and pitch of the parallax barrier based on an included angle between two eyes of the observer.

The width and pitch of the parallax barrier cooperate with the included angle between two eyes of the observer in real time to further ensure that the desired three-dimensional display effect can always be provided to the observer during three-dimensional display.

Optionally, the switchable array is a liquid crystal pixel array.

The liquid crystal panel utilizes polarizers and polarized light, and the parallax barrier panel can thus be formed in the form of a liquid crystal panel. When such a parallax barrier panel is used in conjunction with a liquid crystal display panel, no polarizer is required between the parallax barrier panel and the liquid crystal display panel, and the process and system structure can be advantageously simplified.

Optionally, the switchable array is an electrochromic pixel array.

By forming the parallax barrier panel with an electrochromic material, light leakage of the strips can be reduced more effectively, improving the effect of reality.

Optionally, the switchable array is a liquid lens array.

Similar to the cylindrical lens grating, a liquid lens array can form strips of "cylindrical lenses" in all directions to realize three-dimensional display. When two-dimensional display is performed, the focal length of each liquid lens can be adjusted to infinity by applying, for example, a voltage, without affecting the propagation of light.

Optionally, the control module includes a detection unit for detecting the interocular direction of the observer.

With such a configuration, the detection unit can provide the control module with the interocular direction of the observer in real time. Similarly, the interocular direction of the observer can also be provided to the control module by an external detection unit.

According to another aspect of the invention, an embodiment of the present invention provides a display device. The display device includes a display panel and the abovementioned parallax barrier panel. When a three-dimensional image is to be displayed, the parallax barrier panel forms a parallax barrier, and the parallax barrier cooperates with the display panel to generate the three-dimensional image.

During observing the three-dimensional image, the observer may probably unconsciously adjust his posture with respect to the display equipment. For example, for hand held three-dimensional image display equipment, it is difficult for a user to hold or maintain the display equipment with a precise angle. A small posture adjustment will also make it difficult for the parallax barrier to meet the condition for three-dimensional display, thus undermining the three-dimensional display effect. By adjusting the direction of the parallax barrier based on the interocular direction of the observer, an ideal three-dimensional display effect can always be provided to the observer during three-dimensional display.

Optionally, the display panel is a liquid crystal display panel.

The liquid crystal panel utilizes polarizers and polarized light, and the parallax barrier panel can thus be formed in the form of a liquid crystal panel. When such a parallax barrier panel is used in conjunction with a liquid crystal display panel, no polarizer is required between the parallax barrier panel and the liquid crystal display panel, and the process and system structure can be advantageously simplified.

Optionally, the display panel is an electroluminescent display panel or a plasma display panel.

By applying the electroluminescent display panel or plasma display panel, structures such as backlight module are not required, which makes it possible to utilize the light source more efficiently and simplify the system structure.

Optionally, when a two-dimensional image is to be displayed, the parallax barrier panel does not form a parallax barrier.

For a parallax barrier panel composed of a liquid crystal pixel array or an electrochromic pixel array, when two-dimensional display is performed, the entire switchable array is set to be completely transparent so as not to affect the propagation of light. For a parallax barrier panel composed of a liquid lens array, when two-dimensional display is performed, the focal length of each liquid lens can be adjusted to infinity, for example, by adjusting the voltage, so as not to affect the propagation of light. In such a manner, the display device can be switched between two-dimensional display and three-dimensional display.

According to yet another aspect of the invention, an embodiment of the present invention provides an electronic equipment. The electronic equipment includes the above-mentioned display device.

According to another aspect of the invention, an embodiment of the present invention provides a display method. The display method includes the following steps: presenting a three-dimensional image to an observer using a parallax barrier; and adjusting a direction of the parallax barrier according to an interocular direction of an observer.

During observing the three-dimensional image, the observer may probably unconsciously adjust his posture with respect to the display equipment. For example, for hand held three-dimensional image display equipment, it is difficult for a user to hold or maintain the display equipment with a precise angle. A small posture adjustment will also make it difficult for the parallax barrier to meet the condition for three-dimensional display, thus undermining the three-dimensional display effect. By adjusting the direction of the parallax barrier based on the interocular direction of the observer, an ideal three-dimensional display effect can always be provided to the observer during three-dimensional display.

Optionally, the step of adjusting a direction of the parallax barrier based on an interocular direction of an observer includes: maintaining the direction of the parallax barrier perpendicular to the interocular direction of the observer.

The direction of the parallax barrier is kept perpendicular to the interocular direction of the observer, simplifying the matching relationship between the parallax barrier and the displayed image. It can be understood by those skilled in the art that when a three-dimensional image is normally presented, the direction of the conventional parallax barrier may be inclined with respect to the interocular direction of the observer and matched with the displayed image. Therefore, in the embodiment of the present invention, the control module adjusts the direction of the parallax barrier based on the interocular direction of the observer so that the observer can always observe the three-dimensional image in the normal way.

Optionally, the method further includes: adjusting the width and pitch of the parallax barrier based on an included angle between two eyes of the observer.

The width and pitch of the parallax barrier cooperate with the included angle between two eyes of the observer in real time to further ensure that the desired three-dimensional display effect can always be provided to the observer during three-dimensional display.

DETAILED DESCRIPTION OF THE INVENTION

In the following, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

Figure 1A:
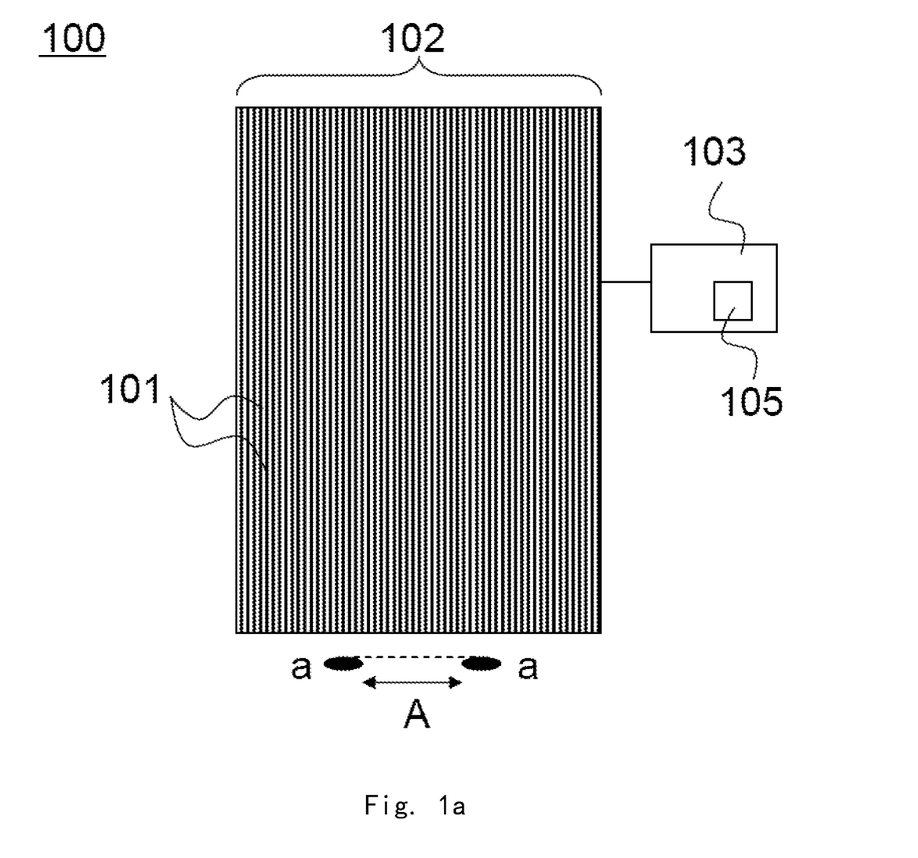
FIG. 1a and FIG. 1b are structural schematic diagrams of a parallax barrier panel according to an embodiment of the invention.
Figure 1B:
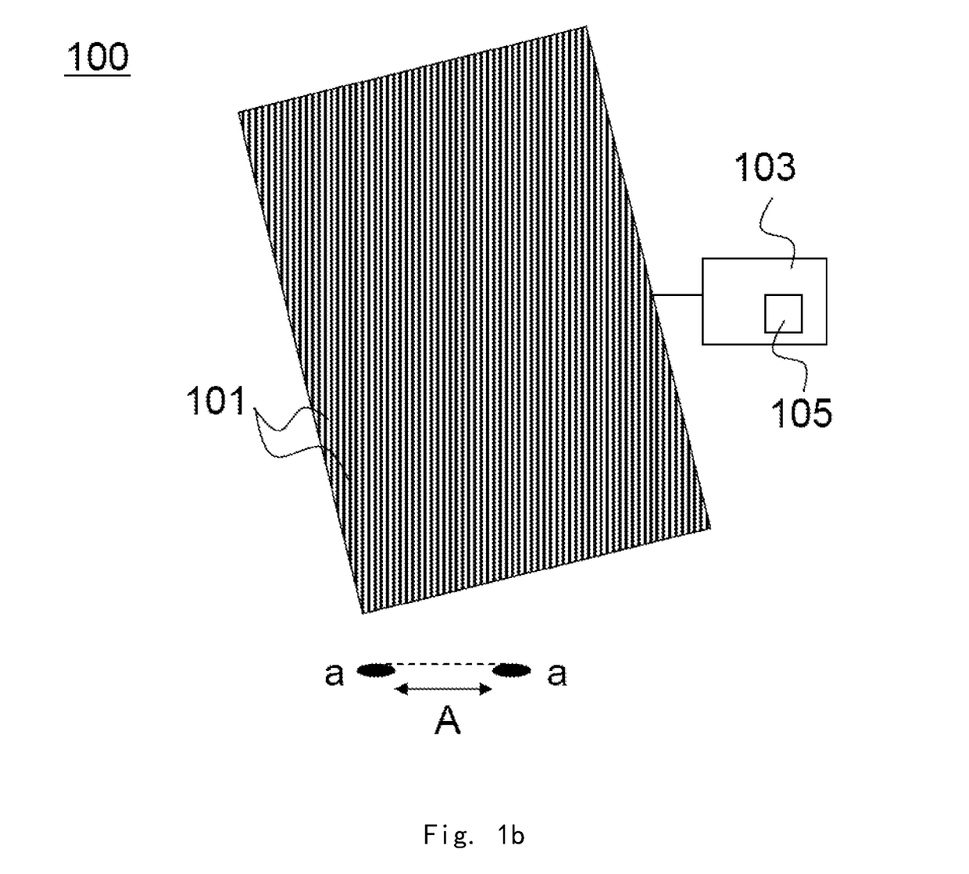

As shown in FIG. 1a and FIG. 1b, according to an aspect of the invention, an embodiment of the invention provides a parallax barrier panel 100. The parallax barrier panel 100 includes: a switchable array 102 for forming a parallax barrier 101, and a control module 103 for adjusting a direction of the parallax barrier based on an interocular direction A of an observer (i.e., a direction of a connecting line between two eyes of an observer).

During observing the three-dimensional image, the observer may probably unconsciously adjust his posture with respect to the display equipment. For example, for hand held three-dimensional image display equipment, it is difficult for a user to hold or maintain the display equipment with a precise angle. A small posture adjustment will also make it difficult for the parallax barrier to meet the condition for three-dimensional display, thus undermining the three-dimensional display effect. By adjusting the direction of the parallax barrier based on the interocular direction of the observer, an ideal three-dimensional display effect can always be provided to the observer during three-dimensional display.

In the context of the disclosure, the "direction of the parallax barrier" refers to the longitudinal direction of the strips in the parallax barrier.

Optionally, the direction of the parallax barrier 101 is perpendicular to the interocular direction A of the observer.

The direction of the parallax barrier is kept perpendicular to the interocular direction of the observer, simplifying the matching relationship between the parallax barrier and the displayed image. It can be understood by those skilled in the art that when a three-dimensional image is normally presented, the direction of the conventional parallax barrier may be inclined with respect to the interocular direction of the observer and matched with the displayed image. Therefore, in the embodiment of the present invention, the control module adjusts the direction of the parallax barrier based on the interocular direction of the observer so that the observer can always observe the three-dimensional image in the normal way.

Figure 2:
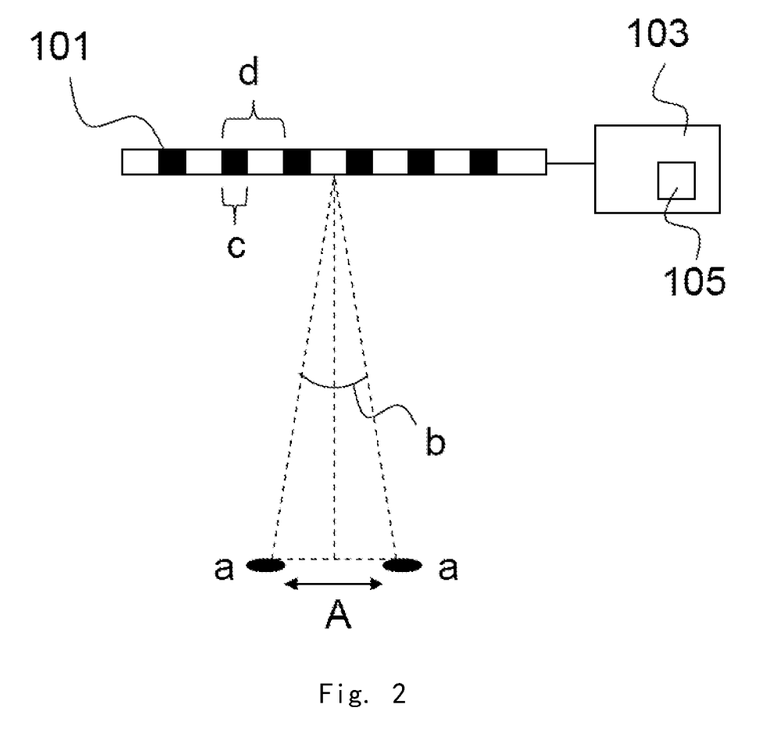
FIG. 2 is a schematic diagram of adjustment for a parallax barrier panel according to the embodiment of the invention.

FIG. 2 is a schematic diagram of adjustment for a parallax barrier panel according to the embodiment of the invention. The viewing angle of the schematic diagram is parallel to the surface of the parallax barrier panel and is perpendicular to the interocular direction A of the observer. As shown in FIG. 2, optionally, the control module 103 further adjusts the width c and pitch d of the parallax barrier 101 based on an included angle b between two eyes of the observer.

The width and pitch of the parallax barrier cooperate with the included angle between two eyes of the observer in real time to further ensure that the desired three-dimensional display effect can always be provided to the observer during three-dimensional display.

In the context of the disclosure, the "included angle between two eyes of the observer" refers to the included angle of the observer's eyes relative to the center of the parallax barrier. Therefore, there is a positive correlation between "the included angle between two eyes of the observer" and "a ratio of the distance between the eyes to the distance between the observer and the parallax barrier".

Figure 3:
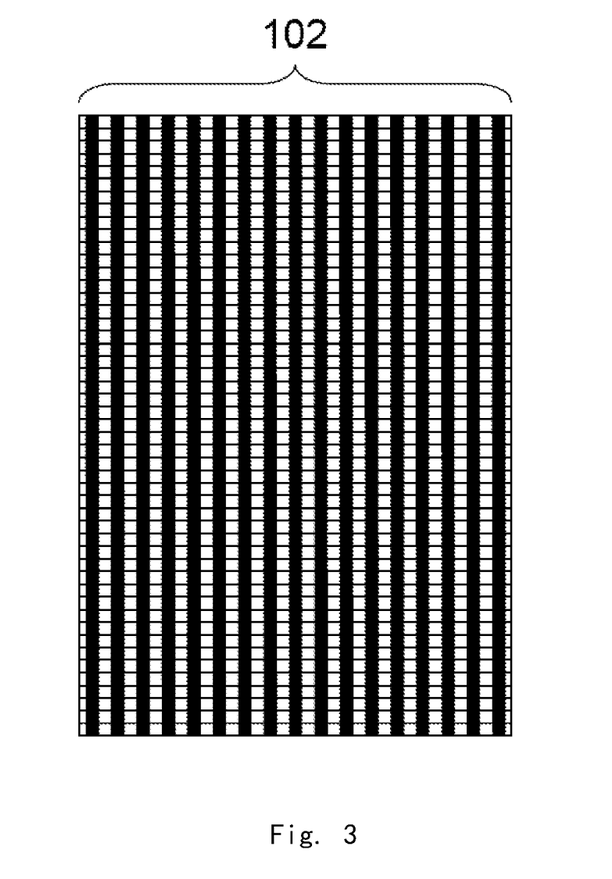
FIG. 3 is a structural schematic diagram of a switchable array in a parallax barrier panel according to an embodiment of the invention.

As shown in FIG. 3, optionally, the switchable array 102 can be a liquid crystal pixel array.

The liquid crystal panel utilizes polarizers and polarized light, and the parallax barrier panel can thus be formed in the form of a liquid crystal panel. When such a parallax barrier panel is used in conjunction with a liquid crystal display panel, no polarizer is required between the parallax barrier panel and the liquid crystal display panel, and the process and system structure can be advantageously simplified.

Optionally, the switchable array 102 can also be an electrochromic pixel array.

By forming the parallax barrier panel with an electrochromic material, light leakage of the strips can be reduced more effectively, improving the effect of reality.

Figure 4:
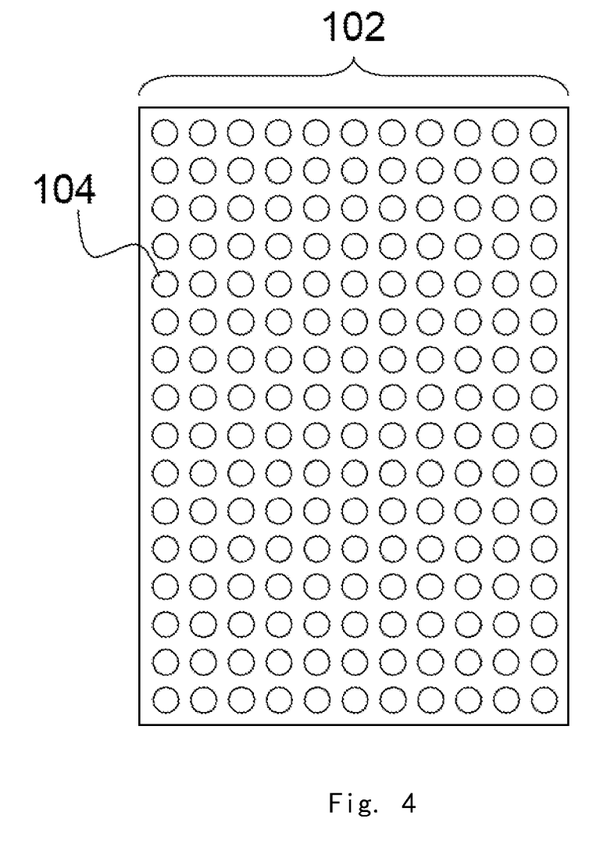
FIG. 4 is a structural schematic diagram of a switchable array in a parallax barrier panel according to another embodiment of the invention.

As shown in FIG. 4, optionally, the switchable array 102 is an array of liquid lenses 104.

Similar to the cylindrical lens grating, a liquid lens array can form strips of "cylindrical lenses" in all directions to realize three-dimensional display. When two-dimensional display is performed, the focal length of each liquid lens 104 can be adjusted to infinity by applying, for example, a voltage, without affecting the propagation of light.

As shown in FIG. 1a, FIG. 1b and FIG. 2, optionally, the control module 103 can include a detection unit 105 for detecting the interocular direction of the observer.

With such a configuration, the detection unit can provide the control module with the interocular direction of the observer in real time. Similarly, the interocular direction of the observer can also be provided to the control module by an external detection unit. For an electronic equipment such as a mobile phone, the external detection unit can be a front camera. In the context of the disclosure, each "unit" and "module" in the embodiments can be realized by a computer (e.g. personal computer) or a combination of a computer and a suitable sensor; the processing of each "unit" and "module" can be realized e.g. by a processor in the computer.

Figure 5:
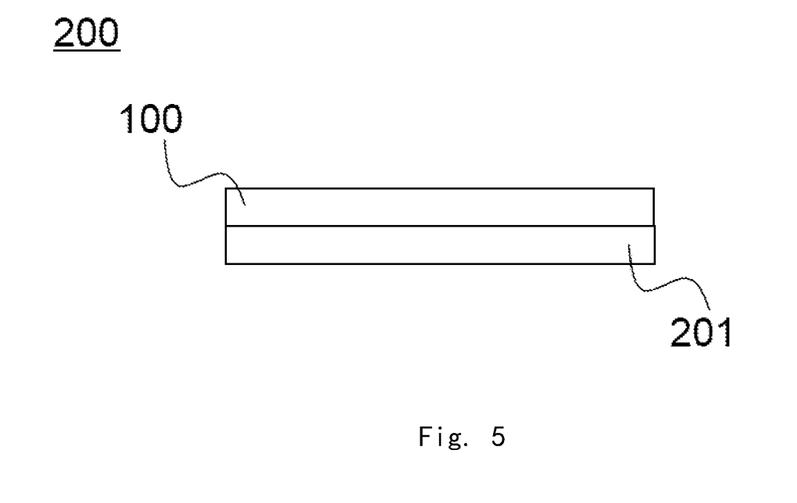
FIG. 5 is a structural schematic diagram of a display device according to an embodiment of the invention.

As shown in FIG. 5, according to another aspect of the invention, an embodiment of the present invention provides a display device 200. The display device 200 includes a display panel 201 and the abovementioned parallax barrier panel 100. When a three-dimensional image is to be displayed, the parallax barrier panel 100 forms a parallax barrier 101 as shown in FIG. 1b, and the parallax barrier 101 cooperates with the display panel 201 to generate the three-dimensional image.

During observing the three-dimensional image, the observer may probably unconsciously adjust his posture with respect to the display equipment. For example, for hand held three-dimensional image display equipment, it is difficult for a user to hold or maintain the display equipment with a precise angle. A small posture adjustment will also make it difficult for the parallax barrier to meet the condition for three-dimensional display, thus undermining the three-dimensional display effect. By adjusting the direction of the parallax barrier based on the interocular direction of the observer, an ideal three-dimensional display effect can always be provided to the observer during three-dimensional display.

Optionally, the display panel 201 can be a liquid crystal display panel.

The liquid crystal panel utilizes polarizers and polarized light, and the parallax barrier panel can thus be formed in the form of a liquid crystal panel. When such a parallax barrier panel is used in conjunction with a liquid crystal display panel, no polarizer is required between the parallax barrier panel and the liquid crystal display panel, and the process and system structure can be advantageously simplified.

Optionally, the display panel 201 can also be an electroluminescent display panel or a plasma display panel.

By applying the electroluminescent display panel or plasma display panel, structures such as backlight module are not required, which makes it possible to utilize the light source more efficiently and simplify the system structure.

Optionally, when a two-dimensional image is to be displayed, the parallax barrier panel 100 does not form a parallax barrier.

For a parallax barrier panel composed of a liquid crystal pixel array or an electrochromic pixel array, when two-dimensional display is performed, the entire switchable array is set to be completely transparent so as not to affect the propagation of light. For a parallax barrier panel composed of a liquid lens array, when two-dimensional display is performed, the focal length of each liquid lens can be adjusted to infinity, for example, by adjusting the voltage, so as not to affect the propagation of light. In such a manner, the display device can be switched between two-dimensional display and three-dimensional display.

According to yet another aspect of the invention, an embodiment of the present invention provides an electronic equipment. The electronic equipment includes the abovementioned display device 200. The electronic equipment can be any product or component with display function, such as mobile phone, tablet computer, TV, display, notebook computer, digital photo frame and navigator. The implementation of the electronic equipment can refer to the embodiments of the abovementioned display device, which will not be repeated herein.

Figure 6:
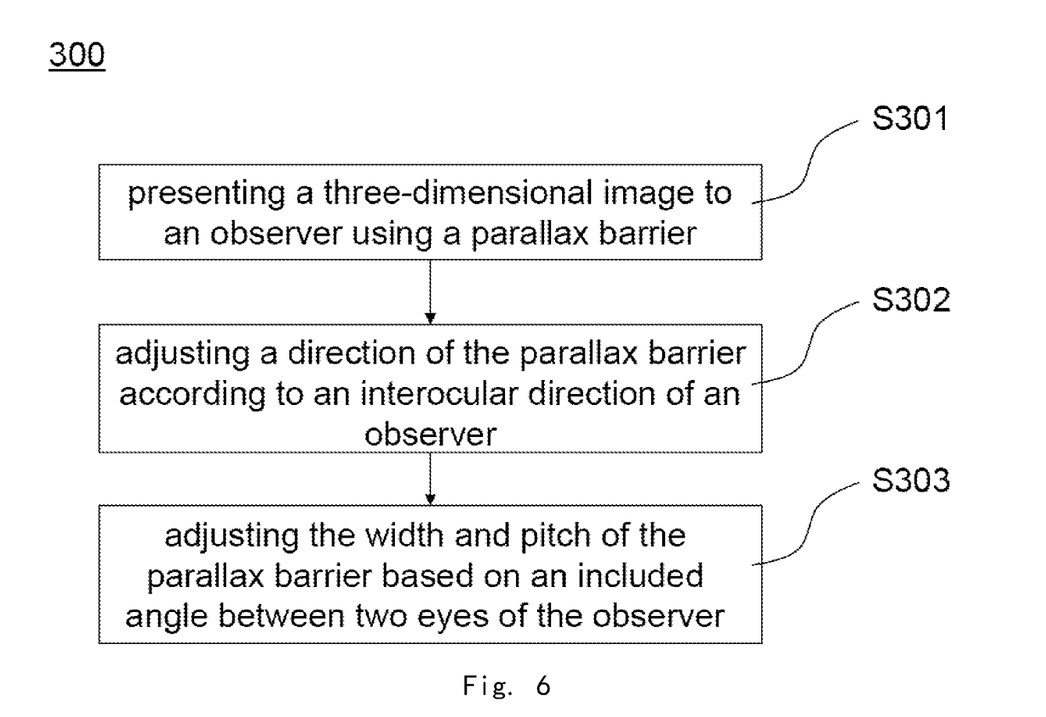
FIG. 6 is a flow chart of a display method according to an embodiment of the invention.

As shown in FIG. 6, according to another aspect of the invention, an embodiment of the present invention provides a display method 300. The display method 300 includes the following steps: S301, presenting a three-dimensional image to an observer using a parallax barrier; and S302, adjusting a direction of the parallax barrier according to an interocular direction of an observer.

During observing the three-dimensional image, the observer may probably unconsciously adjust his posture with respect to the display equipment. For example, for hand held three-dimensional image display equipment, it is difficult for a user to hold or maintain the display equipment with a precise angle. A small posture adjustment will also make it difficult for the parallax barrier to meet the condition for three-dimensional display, thus undermining the three-dimensional display effect. By adjusting the direction of the parallax barrier based on the interocular direction of the observer, an ideal three-dimensional display effect can always be provided to the observer during three-dimensional display.

Optionally, the step of adjusting a direction of the parallax barrier based on an interocular direction of an observer includes: maintaining the direction of the parallax barrier perpendicular to the interocular direction of the observer.

The direction of the parallax barrier is kept perpendicular to the interocular direction of the observer, simplifying the matching relationship between the parallax barrier and the displayed image. It can be understood by those skilled in the art that when a three-dimensional image is normally presented, the direction of the conventional parallax barrier may be inclined with respect to the interocular direction of the observer and matched with the displayed image. Therefore, in the embodiment of the present invention, the control module adjusts the direction of the parallax barrier based on the interocular direction of the observer so that the observer can always observe the three-dimensional image in the normal way.

Optionally, the method 300 further includes: S303, adjusting the width and pitch of the parallax barrier based on an included angle between two eyes of the observer.

The width and pitch of the parallax barrier cooperate with the included angle between two eyes of the observer in real time to further ensure that the desired three-dimensional display effect can always be provided to the observer during three-dimensional display.

In the parallax barrier panel, display substrate, display device, electronic equipment and display method provided by the embodiments of the invention, by adjusting the direction of the parallax barrier based on the interocular direction of the observer, an ideal three-dimensional display effect can always be provided to the observer during three-dimensional display.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

What is claimed is:

1. A parallax barrier panel comprising:
   a switchable array for forming a parallax barrier; and
   a control module for adjusting a direction of the parallax barrier based on an interocular direction of an observer;
   wherein a width and a pitch of the parallax barrier are associated with an included angle between two eyes of the observer;
   and wherein the switchable array is a liquid lens array capable of switching between a two-dimensional display mode and a three-dimensional display mode.

2. The parallax barrier panel according to claim 1, wherein the direction of the parallax barrier is perpendicular to the interocular direction of the observer.

3. The parallax barrier panel according to claim 1, wherein the control module comprises a detection unit for detecting the interocular direction of the observer.

4. A display device comprising
   a display panel; and
   the parallax barrier panel according to claim 1.

5. The display device according to claim 4, wherein the display panel is a liquid crystal display panel.

6. The display device according to claim 4, wherein the display panel is an electroluminescent display panel.

7. The display device according to claim 4, wherein the display panel is a plasma display panel.

8. An electronic equipment comprising the display device according to claim 4.

9. The electronic equipment according to claim 8, wherein the display panel is a liquid crystal display panel.

10. The electronic equipment according to claim 8, wherein the display panel is an electroluminescent display panel.

11. The electronic equipment according to claim 8, wherein the display panel is a plasma display panel.

12. The electronic equipment according to claim 8, wherein when a two-dimensional image is to be displayed, the parallax barrier panel does not form a parallax barrier.

* * * * *

UNITED STATES PATENT AND TRADEMARK OFFICE
CERTIFICATE OF CORRECTION

| | |
|---|---|
| PATENT NO. | : 10,649,230 B2 |
| APPLICATION NO. | : 15/553533 |
| DATED | : May 12, 2020 |
| INVENTOR(S) | : Yezhou Hong et al. |

It is certified that error appears in the above-identified patent and that said Letters Patent is hereby corrected as shown below:

On the Title Page

Item (22), delete "Jan. 4, 2017", and insert --Jan. 3, 2017--.

Signed and Sealed this
Twenty-ninth Day of September, 2020

Andrei Iancu
*Director of the United States Patent and Trademark Office*